(12) United States Patent
Jeong et al.

(10) Patent No.: US 8,947,368 B2
(45) Date of Patent: Feb. 3, 2015

(54) TOUCH SCREEN PANEL

(75) Inventors: Hwan-Hee Jeong, Yongin (KR); Tae-Hyeog Jung, Yongin (KR); Sung-Ku Kang, Yongin (KR); Jung-Mok Park, Yongin (KR); Choon-Hyop Lee, Yongin (KR); Shawn Kim, Yongin (KR); Sang-Kook Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1110 days.

(21) Appl. No.: 12/543,409

(22) Filed: Aug. 18, 2009

(65) Prior Publication Data
US 2010/0182252 A1 Jul. 22, 2010

(30) Foreign Application Priority Data
Jan. 16, 2009 (KR) .......................... 10-2009-0003639

(51) Int. Cl.
G09G 5/00 (2006.01)
G06F 3/041 (2006.01)
G02F 1/13363 (2006.01)
G02F 1/1333 (2006.01)
G06F 3/044 (2006.01)

(52) U.S. Cl.
CPC ........ *G02F 1/13363* (2013.01); *G02F 1/13338* (2013.01); *G06F 3/044* (2013.01); *G02F 2001/133633* (2013.01)
USPC .......................................... 345/173; 345/156

(58) Field of Classification Search
CPC ............ G02F 1/13338; G02F 1/13363; G02F 2001/133633; G06F 3/044
USPC ............ 345/156–184, 104; 178/18.01–20.04
See application file for complete search history.

(56) References Cited

U.S. PATENT DOCUMENTS 5,565,658 A * 10/1996 Gerpheide et al. ......... 178/18.02
6,317,108 B1 * 11/2001 Kalt ................................ 345/85
(Continued)

FOREIGN PATENT DOCUMENTS

CN 101140368 A 3/2008
EP 2 239 622 A1 10/2010
(Continued)

OTHER PUBLICATIONS

KIPO Office action dated Aug. 30, 2010, for priority Korean Patent application 10-2009-0003639, noting listed references in this IDS.
(Continued)

*Primary Examiner* — Patrick F Marinelli
(74) *Attorney, Agent, or Firm* — Christie, Parker & Hale, LLP

(57) ABSTRACT

A touch screen panel includes a transparent substrate; a plurality of first sensing patterns at a first side of the transparent substrate and coupled to each other along a first direction; a plurality of second sensing patterns at the first side of the transparent substrate and coupled to each other along a second direction, the second sensing patterns being alternately arranged with the first sensing patterns not to overlap with the first sensing patterns; and a phase difference compensating layer at the first side of the transparent substrate and adapted to compensate for a birefringence phase difference of a liquid crystal layer in a liquid crystal display panel at a second side of the transparent substrate.

9 Claims, 3 Drawing Sheets

(56) References Cited

U.S. PATENT DOCUMENTS

| | | | |
|---|---|---|---|
| 6,876,355 B1* | 4/2005 | Ahn et al. | 345/173 |
| 7,268,770 B1* | 9/2007 | Takahata et al. | 345/173 |
| RE41,731 E* | 9/2010 | Dietz et al. | 343/893 |
| 8,274,488 B2* | 9/2012 | Bae | 345/173 |
| 2001/0026330 A1 | 10/2001 | Oh | |
| 2003/0016316 A1* | 1/2003 | Sahouani et al. | 349/96 |
| 2003/0052867 A1* | 3/2003 | Shigetaka et al. | 345/173 |
| 2004/0141096 A1* | 7/2004 | Mai | 349/12 |
| 2005/0156906 A1* | 7/2005 | Chiu et al. | 345/173 |
| 2007/0176907 A1* | 8/2007 | Ishii | 345/177 |
| 2007/0240914 A1 | 10/2007 | Lai et al. | |
| 2007/0242054 A1* | 10/2007 | Chang et al. | 345/173 |
| 2008/0309635 A1 | 12/2008 | Matsuo | |
| 2009/0102808 A1* | 4/2009 | Huang et al. | 345/173 |
| 2010/0020265 A1* | 1/2010 | Senoue et al. | 349/62 |
| 2010/0033443 A1* | 2/2010 | Hashimoto | 345/173 |
| 2010/0090979 A1* | 4/2010 | Bae | 345/174 |
| 2013/0222317 A1* | 8/2013 | Abiru et al. | 345/173 |

FOREIGN PATENT DOCUMENTS

| | | |
|---|---|---|
| JP | 2 135317 A | 5/1990 |
| JP | 06-160835 | 6/1994 |
| JP | 2004-005102 | 1/2004 |
| JP | 2004-213187 | 7/2004 |
| JP | 2007-171501 | 7/2007 |
| JP | 2008-310550 | 12/2008 |
| KR | 1020000066059 | 11/2000 |
| KR | 10-2001-0093348 | 10/2001 |
| KR | 1020040017139 | 2/2004 |
| KR | 10-2005-0072680 | 7/2005 |
| KR | 1020070078706 | 8/2007 |
| KR | 10-2007-0102414 | 10/2007 |

OTHER PUBLICATIONS

European Search Report dated Feb. 23, 2010, for corresponding European Patent application 09176259.1, noting listed references in this IDS.

EPO Office Action dated Jun. 27, 2011 issued in European Patent Application No. 09176259, 6 pages.

Japanese Patent Office Action dated Nov. 8, 2011 for Japanese application No. 2009-165827, pp. 1-4.

Korean Registration Determination Certificate dated Feb. 25, 2011, for Priority Korean Application 10-2009-0003639, 2 pages.

* cited by examiner

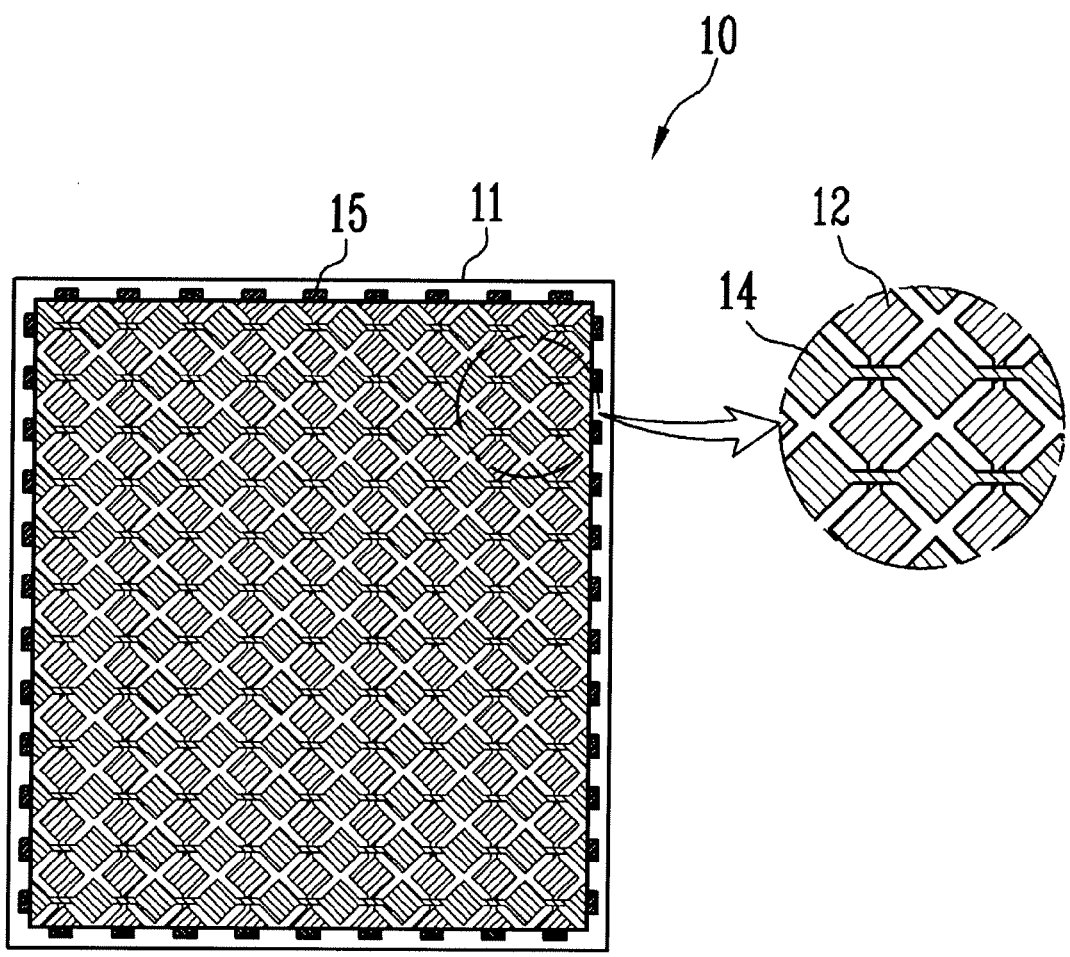

TOUCH SCREEN PANEL

CROSS-REFERENCE TO RELATED APPLICATIONS

This application claims priority to and the benefit of Korean Patent Application No. 10-2009-0003639, filed on Jan. 16, 2009, in the Korean Intellectual Property Office, the entire content of which is incorporated herein by reference.

BACKGROUND OF THE INVENTION

1. Field of the Invention

The present invention relates to a touch screen panel, and more particularly, to a touch screen panel provided on a liquid crystal display device.

2. Description of Related Art

A touch screen panel is an input device by which a user can input his or her instruction by selecting an instructed content displayed on a screen such as an image display device, etc. using a finger or an object.

To this end, the touch screen panel is provided on the front side of the image display device to convert a contact position in direct contact with the finger or object into an electrical signal. Therefore, the instructed content selected at the contact position is accepted as an input signal.

The applications of the touch screen panel as described above have expanded widely because it can operate the image display device and replace an input device, e.g., a keyboard, a mouse, or the like, coupled to the image display device.

The touch screen panel can be implemented as a resistive type, a photosensitive type and an electrostatic capacitive type.

Among others, the electrostatic capacitive type touch screen panel includes a conductive sensing pattern to sense a change in electrostatic capacitance formed in association with other sensing patterns in the vicinity thereof or a ground electrode, etc., thereby converting a contact position into an electrical signal.

However, if the touch screen panel is attached to the image display device, the volume of the entire display device is increased, therefore, it is inconvenient to carry and results in less portability. Thus, there is a demand for the development of a thin touch screen panel.

Here, the image display device positioned under the touch screen panel is provided as a flat panel display device such as a liquid crystal display device, an organic light emitting display device, etc. When the image display device is a liquid crystal display device, a phase difference film is additionally provided in order to secure optical properties of the liquid crystal display device.

SUMMARY OF THE INVENTION

It is an aspect of embodiments of the present invention to provide a touch screen panel including a phase difference compensation layer to compensate for a birefringence phase difference of a liquid crystal layer formed in a liquid crystal display panel of a liquid crystal display device. The phase difference compensation layer is formed on a transparent substrate that implements the touch screen panel, so that there is no need to additionally form a separate phase difference film, thereby making it possible to implement a thin touch screen panel, reduce its manufacturing costs, and simplify its structure.

According to an embodiment of the present invention, there is provided a touch screen panel including: a transparent substrate; a plurality of first sensing patterns at a first side of the transparent substrate and coupled to each other along a first direction; a plurality of second sensing patterns at the first side of the transparent substrate and coupled to each other along a second direction, the second sensing patterns being alternately arranged with the first sensing patterns not to overlap with the first sensing patterns; and a phase difference compensating layer at the first side of the transparent substrate and adapted to compensate for a birefringence phase difference of a liquid crystal layer provided in a liquid crystal display panel attached to a second side of the transparent substrate.

Also, the phase difference compensating layer may be between the first sensing patterns and the second sensing patterns and made of a material having a same birefringence property as the liquid crystal layer provided in the liquid crystal display panel, wherein the liquid crystal layer in the liquid crystal display panel and the phase difference compensating layer include liquid crystal molecules in a same mode.

Also, the touch screen panel may further include an insulating layer on the second sensing patterns, a polarizer on the insulating layer, and a window (or screen) on the polarizer, wherein the window may comprise an icon sheet made of a polymer material.

Also, a group of the first sensing patterns having a same X-coordinate in one column may be coupled to each other, and a group of the second sensing patterns having a same Y-coordinate in one row may be coupled to each other. The touch screen panel may further include a plurality of metal patterns, the plurality of metal patterns being located at edge regions of the regions where the first and second sensing patterns are formed to electrically couple the sensing patterns in said column and/or said row to position detecting lines.

According to an embodiment of the present invention, a flat panel display device includes a liquid crystal display panel having a liquid crystal layer and a touch screen panel on the liquid crystal display panel. The touch screen panel includes a transparent substrate, a plurality of first sensing patterns at a first side of the transparent substrate, a plurality of second sensing patterns at the first side of the transparent substrate, and a phase difference compensating layer between the first and second sensing patterns and adapted to compensate for a birefringence phase difference of the liquid crystal layer at a second side of the transparent substrate.

With the embodiments of the present invention as described above, the optical property of the liquid crystal display device positioned below the touch screen panel can be compensated for without interposing a separate phase difference film thereon. Therefore, the embodiments of the present invention provide a thin touch screen panel, reduce manufacturing costs, and simplify the structure thereof.

BRIEF DESCRIPTION OF THE DRAWINGS

The accompanying drawings, together with the specification, illustrate exemplary embodiments of the present invention, and, together with the description, serve to explain the principles of the present invention.

FIG. 3 is a schematic plan view of the assembled touch screen panel of FIG. 2.

DETAILED DESCRIPTION OF EXEMPLARY EMBODIMENTS

Figure 1:
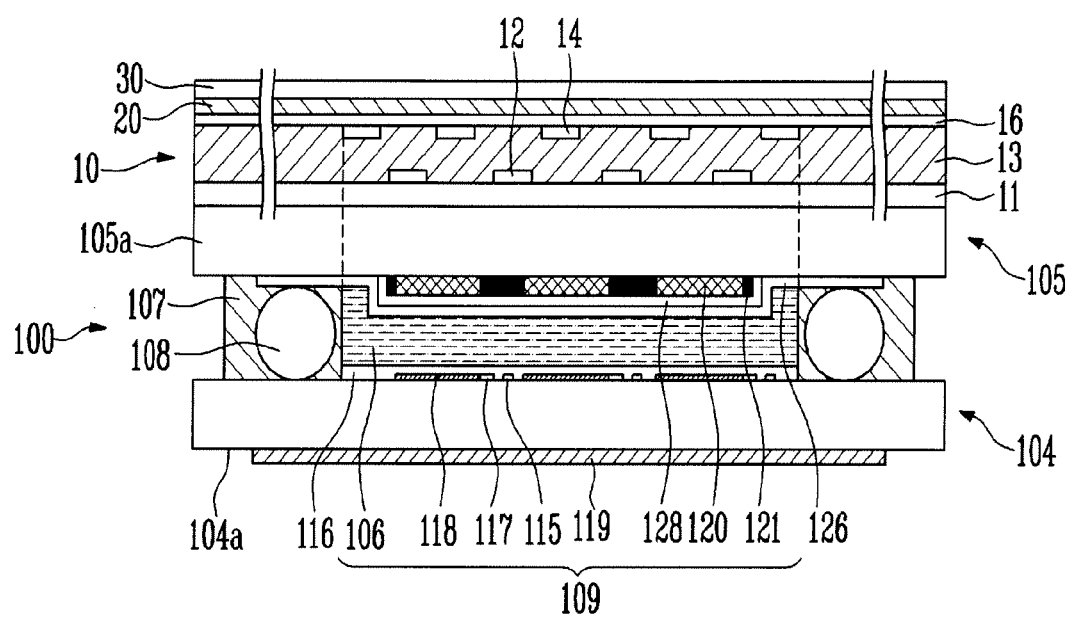
FIG. 1 is a schematic cross-sectional view of an assembled touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" or "coupled to" another element, it can be directly connected to the another element or be indirectly connected to the another element with one or more intervening elements interposed therebetween. Hereinafter, like reference numerals refer to like elements.

Hereinafter, exemplary embodiments according to the present invention will be described in more detail with reference to the accompanying drawings.

FIG. 1 is a schematic cross-sectional view of an assembled touch screen panel according to an embodiment of the present invention.

Referring to FIG. 1, the touch screen panel 10 according to the embodiment of the present invention includes a second polarizer 20 and a window 30 attached on top of the second polarizer 20, and a liquid crystal display panel 100 attached below the second polarizer 20.

The liquid crystal display panel 100 has a structure where a TFT array substrate 104 is joined to a color filter substrate 105 by a sealant 107, and a liquid crystal layer 106 is sealed in a region enclosed by the sealant 107. A gap material 108 is provided inside the sealant 107, and a gap is formed between the TFT array substrate 104 and the color filter substrate 105 by the gap material 108. A region surrounded by the sealant 107 is a display region 109 that displays a picture or a motion picture. Here, the liquid crystal layer 106 may be implemented as a super twisted nematic (STN) mode, a TN mode, a VA mode, or an IPS mode, etc.

The TFT array substrate 104 includes a base 104a made of a material with a high transmittance such as glass, quartz, etc. On the base 104a are provided a pixel electrode 118, a TFT device 117 driving the pixel electrode 118, a data line for transferring a data signal to the TFT device 117, a scan line 115 for transferring a scan signal to the TFT device 117, and an alignment film formed to cover the pixel electrode 118, the TFT device 117, the data line and the scan line 115.

The pixel electrode 118 is made of a transparent conductive material, for example, indium tin oxide (ITO). Also, a first polarizer 119 is adhered to an outer surface (opposite side of the liquid crystal layer 106) of the TFT array substrate 104.

Also, the color filter substrate 105 includes a base 105a made of a material having a high transmittance, such as glass or quartz, in the same manner as the TFT array substrate 104. On a side of the base 105a facing the liquid crystal 106 is formed a color filter layer 120 including three color layers, e.g., a red layer, a green layer and a blue layer, and a black matrix 121 is formed around the color filter layer 120. Also, a common electrode 128 is formed to cover the color filter layer 120 and the black matrix 121, and a second alignment film 126 covers the common electrode 128. The common electrode 128 is made of a transparent conductive material, for example, ITO, in the same manner as the pixel electrode 118.

The liquid crystal layer 106 includes liquid crystal molecules in a STN mode, etc., and is interposed between the two substrates in order to make contact with a first alignment film 116 on the TFT array substrate 104 and the second alignment film 126 on the color filter substrate 105. The alignment of the liquid crystal molecules is controlled by the first alignment film 116 and the second alignment film 126 so that the liquid crystal molecules face in a predetermined direction when a non-selection voltage is applied.

Also, although not shown in FIG. 1, a backlight is provided on the TFT array substrate 104, wherein the light of the backlight is transmitted through the TFT array substrate 104, the liquid crystal layer 106 and the color filter substrate 105 to be displayed through the color filter substrate 105.

The touch screen panel 10 according to the embodiment of the present invention is attached to the liquid crystal display device 100 as described above, that is, to the upper surface of the color substrate 105.

The touch screen panel 10 includes a transparent substrate 11, and first sensing patterns 12, a phase difference compensating layer 13, second sensing patterns 14, metal patterns and an insulating film 16 that are formed sequentially on the transparent substrate 11.

In the embodiment of FIG. 1, the first sensing patterns 12 and the second sensing patterns 14, which are formed in a region corresponding to the display region 109 of the liquid crystal display panel 100, have the phase difference compensating layer 13 interposed therebetween and are disposed alternately on different layers.

If the first and second sensing patterns 12 and 14 are positioned on different layers as described above, first or second sensing patterns 12 or 14 positioned in the same row or in the same column can be coupled to one another in a patterning step. Therefore, a step for forming contact holes on a separate layer for coupling the first or second sensing patterns 12 or 14 positioned in the same row or in the same column to one another may be omitted.

However, the above described embodiment is merely one embodiment of the present invention, and thus, the present invention is not limited thereto.

For example, according to an embodiment of the present invention, the first and sensing patterns 12 and 14 may be formed on the same layers. In this embodiment, one of the first sensing patterns 12 or the second sensing patterns 14 may be formed as coupled to one another in a first direction or in a second direction in the patterning step, and the other of the first or second sensing patterns may be formed to be coupled to one another in the first direction or in the second direction in a contact hole forming step and a coupling patterns forming step.

In addition, a transparent ground electrode and a third insulating film that covers the transparent ground electrode may further be formed on the other surface opposite to the surface of the transparent substrate 11 on which the first and second sensing patterns 12 and 14 are formed, that is, on the lower surface of the transparent substrate 11.

Here, the transparent ground electrode may be used to secure stability between the touch screen panel 10 and the liquid crystal display panel 100 and may also be used to form the electrostatic capacitance with the first and second sensing patterns 12 and 14 according to the design method of the touch screen panel 10.

In other words, in the electrostatic capacitive type touch screen panel 10, in order to sense the contact position, the electrostatic capacitance between the first sensing patterns 12 and the second sensing patterns 14 may be used, or the electrostatic capacitance between the first and second sensing patterns 12 and 14 and the transparent ground electrode may be used, wherein the touch screen panel 10 may be variously modified to have other suitable structures.

When the touch screen panel is attached onto the liquid crystal display panel in a conventional way, in order to compensate for the optical property of the liquid crystal display panel, that is, the birefringence phase difference of the liquid crystal layer, a separate phase difference film should be attached. However, such an attachment of the phase difference film causes disadvantages in that it does not conform to the trend of thinness, and it leads to increase in manufacturing costs.

The embodiment of the present invention overcomes the disadvantages as described above by removing the phase difference film and forming a substance that compensates for the birefringence phase difference of the liquid crystal layer within the touch screen panel 10.

In other words, in the embodiment of the present invention, the substance having the same birefringence property of the liquid crystal layer 106 is formed as the phase difference compensating layer 13 in order to compensate for the birefringence phase difference of the liquid crystal layer 106.

Therefore, in the embodiment of the present invention, when the liquid crystal layer 106 is formed of liquid crystal molecules in a STN mode, the same liquid crystal layer in the STN mode of the liquid crystal display panel is implemented as the phase difference compensating layer 13 in order to compensate for the birefringence phase difference of the liquid crystal layer 106.

However, in this embodiment, the phase difference compensating layer 13 is set to compensate for the birefringence phase difference of the liquid crystal layer 106 of the liquid crystal display panel 100. For example, the alignment of the STN liquid crystal molecules of the phase difference compensating layer 13 is suitably controlled in order to compensate for the birefringence phase difference of the liquid crystal layer 106 of the liquid crystal display panel 100.

Also, in the embodiment of the present invention, a second polarizer 20 and a window 30 are additionally formed on the insulating film 16.

Here, the window 30, which is provided for improving the stiffness of the touch screen panel and protecting the panel, is generally implemented using glass or plastic made of a transparent material. However, the present invention is not limited thereto, but the window 30 may also be formed of an icon sheet made of a polymer material such as polyethylene terephthalate (PET), etc. printed with a log and a boundary decoration.

Figure 2:
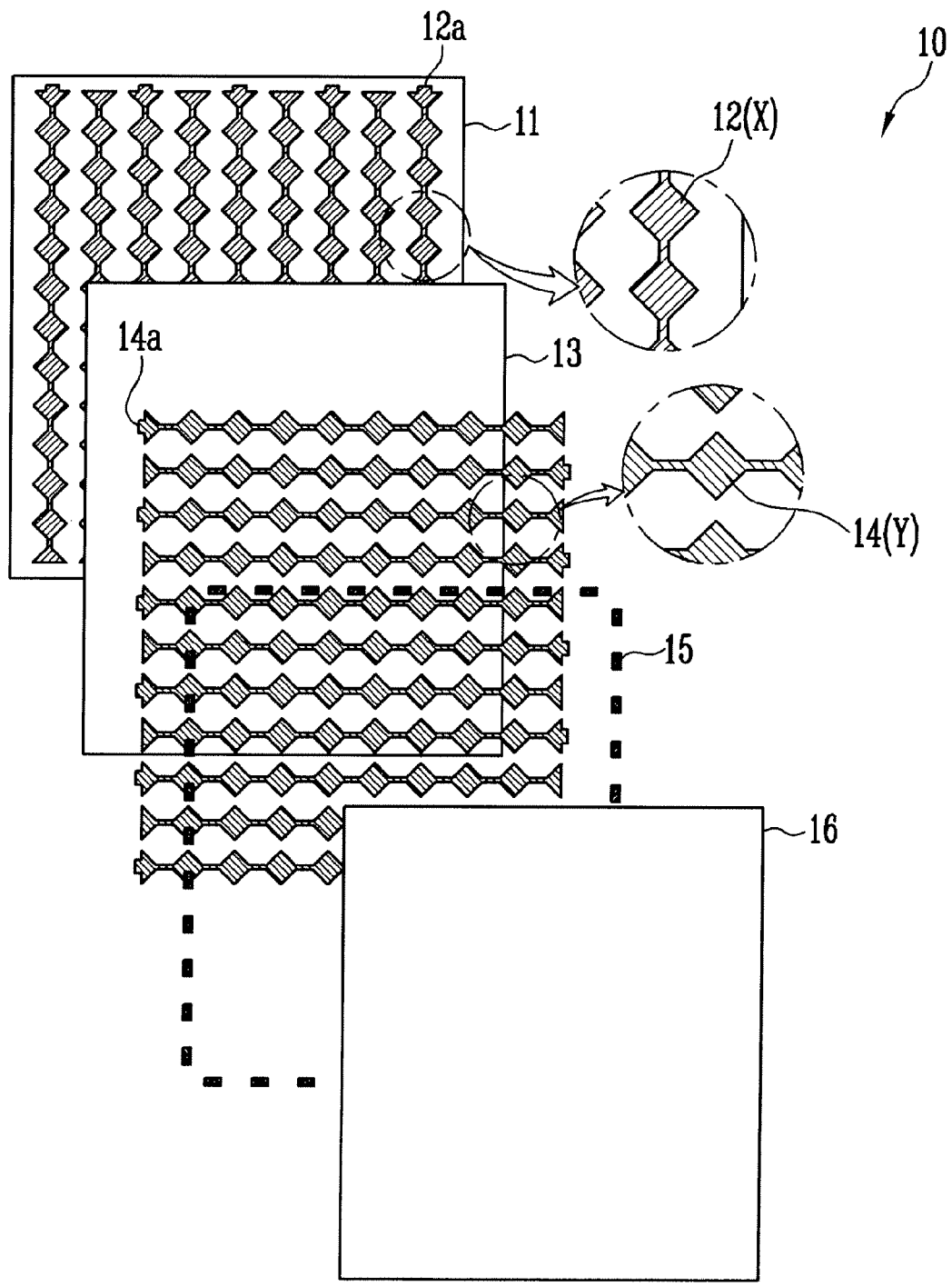
FIG. 2 is an exploded schematic plan view of one embodiment of the touch screen panel of FIG. 1.

FIG. 2 is an exploded schematic plan view of one embodiment of the touch screen panel of FIG. 1, and FIG. 3 is a schematic plan view of the assembled touch screen panel of FIG. 2.

Referring to FIGS. 2 and 3, the touch screen panel 10 according to the embodiment of the present invention includes a transparent substrate 11, first sensing patterns 12, a phase difference compensating layer 13, second sensing patterns 14, metal patterns 15 and an insulating film 16 that are formed sequentially on the transparent substrate 11.

The first sensing patterns 12 are formed on one surface of the transparent substrate 11 to be coupled to each other along a first direction. For example, the first sensing patterns 12 may be formed on the upper surface of the transparent substrate 11 to be closed to each other, having a regular pattern such as a pattern of diamond shapes. The first sensing patterns 12 as described above may include a plurality of X patterns, wherein first sensing patterns 12 having the same X-coordinate in one column are coupled to each other. Here, the shape of the first sensing patterns 12 is not limited to the diamond shape, but it may be implemented as various suitable shapes so that the sensing patterns can be closed to each other.

The first sensing patterns 12 have pads 12a for electrically coupling the first sensing patterns 12 connected in columns to the metal patterns 15. The pads 12a of the first sensing patterns 12 may be alternately provided on the upper side or the lower side, may be positioned on only the upper side or the lower side, or may be positioned on both the upper and lower sides of the columns.

However, the first sensing patterns 12 are formed not to overlap with the second sensing patterns 14, except for the coupling portions thereof. In other words, the first sensing patterns 12 and the second sensing patterns 14 are arranged alternately to cross each other at their coupling portions.

The phase difference compensating layer 13 is formed on the first sensing patterns 12 to cover them. In the embodiment of the present invention, the phase difference compensating layer 13 is implemented as a liquid crystal layer in the same mode as the liquid crystal layer 106 of the liquid crystal display device 100 in order to compensate for the birefringence phase difference of the liquid crystal layer 106 of the liquid crystal display device 100. The phase difference compensating layer 13 may be formed using a suitable liquid crystal injection or coating method. However, the present invention is not limited thereto, and the phase difference compensating layer 13 may be made of other suitable materials.

The second sensing patterns 14 are formed on the phase difference compensating layer 13 to be coupled to each other along a second direction, but are disposed alternately with the first sensing patterns 12 so as not to overlap with the first sensing patterns 12. For example, the second sensing patterns 14 may be formed to be closed to each other, having the same pattern of diamonds as the first sensing patterns 12, and may include a plurality of Y patterns, wherein second sensing patterns 14 having the same Y-coordinate in one row are coupled to each other.

The second sensing patterns 14 have pads 14a for electrically coupling the second sensing patterns 14 connected in rows to the metal patterns 15. The pads 14a of the second sensing patterns 14 may be alternately provided on the left side or the right side or may be positioned on both the left and right sides of the second sensing patterns 14 connected in rows.

In addition, the first and second sensing patterns 12 and 14 and the phase difference compensating layer 13 are made of a transparent material so that light emitted from a display panel, etc. located below the touch screen panel 10 can be transmitted through the touch screen panel 10. For example, the first and second sensing patterns 12 and 14 are made of a transparent electrode material such as indium tin oxide (hereinafter, referred to as ITO).

The thickness of the touch screen panel 10 (in particular, the first and second sensing patterns 12 and 14) is set in a suitable range so that it can have a relatively low surface resistance, and a suitable light transmittance so that light from the display panel is transmitted through the touch screen panel 10. In other words, the thickness of the first and second sensing patterns 12 and 14 and the phase difference compensating layer 13 can be suitably set or optimized in consideration of the desired transmittance and surface resistance.

For example, the first and second sensing patterns 12 and 14 may be formed in an indium tin oxide (hereinafter, referred to as ITO) pattern having a thickness of 100 to 300 Å. However, this is merely one embodiment, and the present invention is not limited thereto. Therefore, the thickness of the first and second sensing patterns 12 and 14 may also be changed in consideration of the transmittance and/or the surface resistance, etc., as those skilled in the art would appreciate.

The metal patterns 15 are disposed on edge regions of regions where the first and second sensing patterns 12 and 14 are formed, in particular, on regions corresponding to the pads 12a and 14a of the first and second sensing patterns 12 and 14. The metal patterns 15 as described above electrically couple the sensing patterns 12 and 14 connected in columns and rows to position detecting lines, respectively, to supply contact position detecting signals to a suitable driving circuit, etc.

The insulating film 16 is formed on the second sensing patterns 14 to cover them. For example, the insulating film 16 may be formed on the second sensing patterns 14, and made of a transparent insulating material having a thickness of 400 to 1000 Å. The insulating film 16 as described may be omitted according to the design of a product.

If the assembled touch screen panel 10 as shown in FIG. 3 is in contact with a human's finger or an object, a change in electrostatic capacitance in accordance with the contact position is transferred to the driving circuit, via the first and second sensing patterns 12 and 14, the metal patterns 15 and the position detecting lines. The change in electrostatic capacitance is converted into an electrical signal by suitable X and Y input processing circuits, etc. so that the contact position is determined.

With the touch screen panel 10 of the embodiment as described above, the first sensing patterns 12 coupled to each other along the first direction and the second sensing patterns 14 coupled to each other along the second direction are located on different layers, making it possible to reduce the number of masks utilized during fabrication and to simplify the fabrication process.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel comprising:
   a transparent substrate;
   a plurality of first sensing patterns at a first side of the transparent substrate and coupled to each other along a first direction;
   a plurality of second sensing patterns at the first side of the transparent substrate and coupled to each other along a second direction, the second sensing patterns being alternately arranged with the first sensing patterns not to overlap with the first sensing patterns;
   an insulating layer on the second sensing patterns and spaced from the first sensing patterns;
   a phase difference compensating layer comprising a transparent liquid crystal material at the first side of the transparent substrate and controlled to compensate for a birefringence phase difference of a liquid crystal layer in a liquid crystal display panel at a second side of the transparent substrate;
   a color filter layer between the phase difference compensating layer and the liquid crystal layer, the color filter layer comprising a red layer, a green layer, and a blue layer;
   a transparent ground electrode on the second side of the transparent substrate; and
   an insulating film on the second side of the transparent substrate and covering the transparent ground electrode,
   wherein at least some of the plurality of second sensing patterns are in the phase difference compensating layer, and
   wherein the phase difference compensating layer is formed using a liquid crystal injection or coating method.

2. The touch screen panel as claimed in claim 1, wherein the phase difference compensating layer is between the first sensing patterns and the second sensing patterns and made of a material having a same birefringence property as the liquid crystal layer in the liquid crystal display panel.

3. The touch screen panel as claimed in claim 2, wherein the liquid crystal layer in the liquid crystal display panel and the phase difference compensating layer are formed of liquid crystal molecules in a same mode.

4. The touch screen panel as claimed in claim 1, further comprising:
   a polarizer on the insulating layer; and
   a window on the polarizer.

5. The touch screen panel as claimed in claim 4, wherein the window comprises a sheet made of a polymer material.

6. The touch screen panel as claimed in claim 1,
   wherein a group of the first sensing patterns having a same X-coordinate in one column are coupled to each other,
   wherein a group of the second sensing patterns having a same Y-coordinate in one row are coupled to each other, and
   wherein the touch screen panel further comprises a plurality of metal patterns, the plurality of metal patterns being located at edge regions of the regions where the first and second sensing patterns are formed to electrically couple the sensing patterns in said column and/or row to position detecting lines.

7. A flat panel display device comprising:
   a liquid crystal display panel comprising a liquid crystal layer and a color filter layer, the color filter layer comprising a red layer, a green layer, and a blue layer; and
   a touch screen panel on the liquid crystal display panel, wherein the touch screen panel comprises:
      a transparent substrate;
      a plurality of first sensing patterns at a first side of the transparent substrate;
      a plurality of second sensing patterns at the first side of the transparent substrate;
      an insulating layer on the second sensing patterns and spaced from the first sensing patterns;
      a phase difference compensating layer comprising a transparent liquid crystal material adjacent the first and second sensing patterns and controlled to compensate for a birefringence phase difference of the liquid crystal layer at a second side of the transparent substrate;
      a transparent ground electrode on the second side of the transparent substrate; and
      an insulating film on the second side of the transparent substrate and covering the transparent ground electrode,
   wherein at least some of the plurality of second sensing patterns are in the phase difference compensating layer, and
   wherein the phase difference compensating layer is formed using a liquid crystal injection or coating method.

8. The flat panel display device as claimed in claim 7, wherein the phase difference compensating layer comprises a material having a same birefringence property as the liquid crystal layer.

9. The flat panel display device as claimed in claim 8, wherein the liquid crystal layer and the phase difference compensating layer comprise liquid crystal molecules in a same mode.

* * * * *